United States Patent
Sugiyama

(10) Patent No.: US 6,834,071 B2
(45) Date of Patent: Dec. 21, 2004

(54) SPOT SIZE CONVERTER, SEMICONDUCTOR LASER MODULE AND OPTICAL FIBER LASER DEVICE

(75) Inventor: Tooru Sugiyama, Kanagawa-ken (JP)

(73) Assignee: Kabushiki Kaisha Toshiba, Minato-Ku (JP)

(*) Notice: Subject to any disclaimer, the term of this patent is extended or adjusted under 35 U.S.C. 154(b) by 147 days.

(21) Appl. No.: 10/095,038

(22) Filed: Mar. 12, 2002

(65) Prior Publication Data

US 2002/0131471 A1 Sep. 19, 2002

(30) Foreign Application Priority Data

Mar. 13, 2001 (JP) ................................ P2001-069784

(51) Int. Cl.⁷ .............................................. H01S 3/08
(52) U.S. Cl. .......................... 372/108; 372/109; 385/43
(58) Field of Search .................... 372/29.01, 29.014, 372/9, 109, 108; 385/43

(56) References Cited

U.S. PATENT DOCUMENTS

| | | | |
|---|---|---|---|
| 4,807,954 A | | 2/1989 | Oyamada et al. |
| 5,261,017 A | * | 11/1993 | Melman et al. ............... 385/38 |
| 5,265,177 A | * | 11/1993 | Cho et al. ...................... 385/14 |
| 5,332,690 A | | 7/1994 | Cho et al. |
| 5,351,323 A | * | 9/1994 | Miller et al. ................... 385/28 |
| 5,696,865 A | | 12/1997 | Beeson et al. |
| 5,737,474 A | * | 4/1998 | Aoki et al. ................... 385/131 |
| 5,902,033 A | | 5/1999 | Levis et al. |
| 6,139,156 A | | 10/2000 | Okamori et al. |
| 6,253,003 B1 | * | 6/2001 | Nakamura .................... 385/28 |
| 6,272,269 B1 | * | 8/2001 | Naum ........................... 385/43 |
| 6,349,162 B1 | * | 2/2002 | Shiraishi et al. ............. 385/124 |

OTHER PUBLICATIONS

Wenger et al., "Design and Fabrication of Monolithic optical Spot Size Transformers . . . ", Jour. of Llightwave Tech., Oct. 1994, No. 10.
IEEE J.Quantum Electronics, vol. 3, pp. 1351–1360. 1997; Kenji Kawano et al.; Dec. 1997.

* cited by examiner

Primary Examiner—David Porta
Assistant Examiner—Davienne Monbleau
(74) Attorney, Agent, or Firm—Pillsbury Winthrop LLP

(57) ABSTRACT

A spot size converter comprising an incident area of a first size, an exit area of a second size different from the first size, and side walls defining a light guide, wherein at least a part of side wall inclines from the width direction axis and the thickness direction axis of the incident area is provided. Thereby, it is able to regulate the divergence of the outgoing light, and to optically couple optical elements of different spot size with each other at a high-efficiency. Moreover, the semiconductor laser module and optical fiber laser device using such a spot size converter are provided.

15 Claims, 13 Drawing Sheets

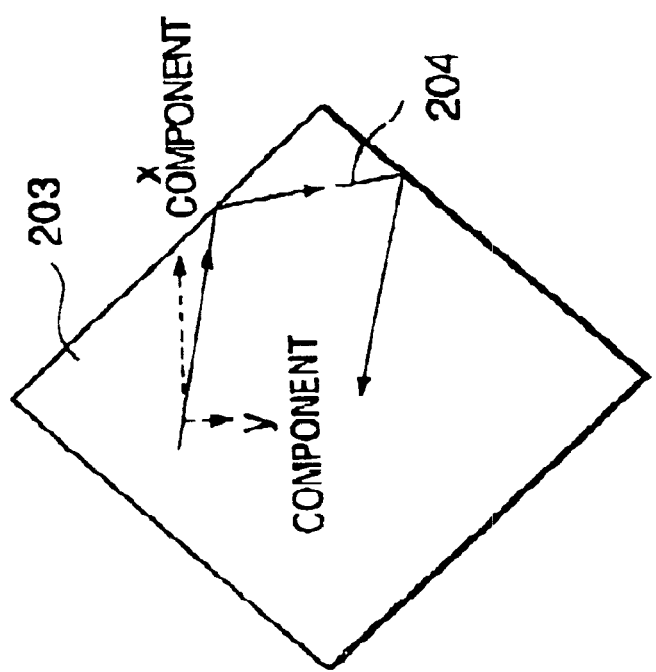
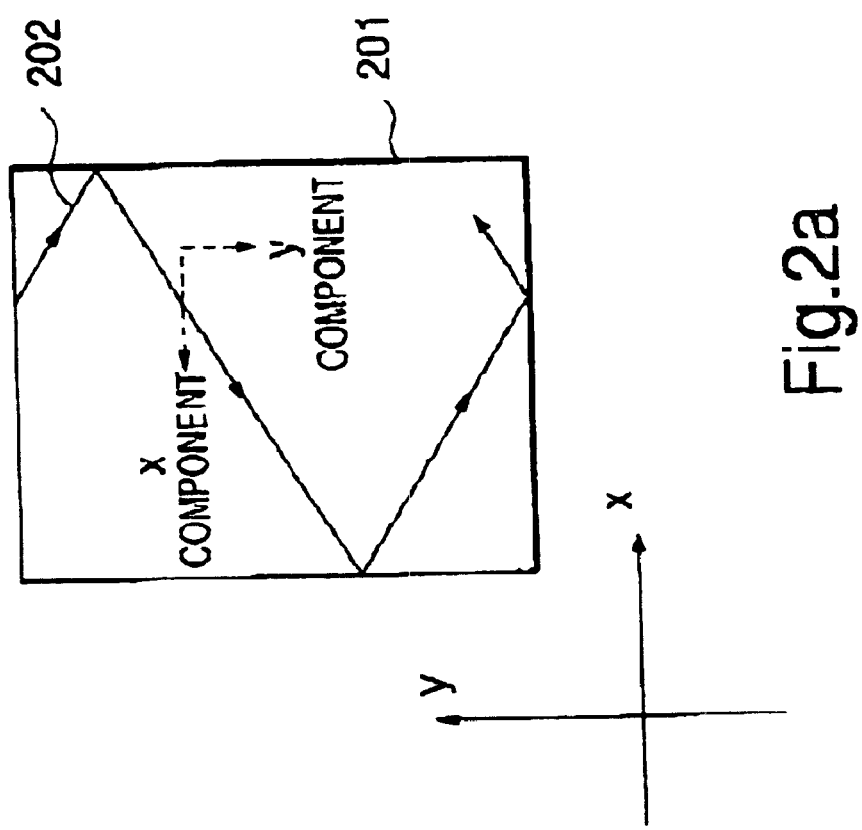
Fig.2b
Fig.2a

SPOT SIZE CONVERTER, SEMICONDUCTOR LASER MODULE AND OPTICAL FIBER LASER DEVICE

FIELD OF THE INVENTION

The present invention relates to a spot size converter for coupling optical elements of different spot size with each other. The present invention relates also to a semiconductor laser module which combines the spot size converter and a semiconductor laser. The present invention relates also to an optical fiber laser device using the spot size converter.

BACKGROUND OF THE INVENTION

Spot size converters have been used for efficiently transmitting light from one optical element to another, for example, from a semiconductor laser to an optical fiber, since these optical elements are different in their spot size with each other Referring now to FIGS. 9 to 11, a structure of a conventional spot size converter will he described In FIG. 9, the numeral 901 denotes a semiconductor laser. A laser light is radiated from a slender exit area 902 with a the width w and a thickness h (w>>h) of the semiconductor laser 901. In FIG. 10, the numeral 1001 denotes an optical fiber which has a core extending through its center. An end face of the core which faces the semiconductor laser 901 forms a receiving area 1002 of a diameter "d". Generally, the exit area 902 of the semiconductor laser 901 and the receiving area 1002 of the optical fiber 1001 fail to agree with each other. From this reasons a light coupling efficiency decreases in having directly coupled these optical elements. Therefore, the semiconductor laser 901 and the optical fiber 1001 are optically coupled together through the spot size converter 1101, as shown in FIG. 11. Spot size converters are generally comprised of a core and a cladding, which are different in refractive index with each other. In FIG. 11, however, the cladding is omitted for clarifying the illustration of the core. Therefore, in practice the numeral 1101 denotes the core of the spot size converter.

The spot size converter 1101 is aligned with the exit area 902 of a semiconductor laser in the receiving area 1102. On the other hand, the exit area 1108 is let be agreed with the receiving area 1002 of the optical fiber 1001. Therefore, the laser light introduced from the semiconductor laser 901 propagates toward the exit area 1103 while repeating total reflection in the spot size converter 1101. The spot size of laser light is converted into a size which meets the receiving area of the optical fiber 1001 as a result of the propagation.

The conventional spot size converter can convert the spot size of an optical beam. However, the conventional spot size converter cannot change a divergence pattern of light exactly. The divergence pattern of outgoing light from the spot size converter 1101 needs to be equal to or less than a light receiving pattern of the optical fiber 1001. As will be discussed later, the divergence pattern of the outgoing light from the spot size converter 1101 is determined by the divergence pattern of the incident light, i.e., the outgoing light from the semiconductor laser 901 and the shape of the spot size converter 1101

As shown in FIG. 9, let Sx-LD and Sy-LD be the width direction component and the thickness direction divergence component pattern 903 of the outgoing light from a semiconductor laser 901, respectively. As shown in FIG. 11, let w and h be the width and the thickness of the incident area 1102 of the spot size converter 1101. And, let dx and dy be the width and the thickness of the exit area 1103 of the spot size converter 1101. Then, let Sx-WG be the width direction divergence component 1104 of the outgoing light from the spot size converter 1101, while let Sy-WG be the thickness direction component thereof. When the side wall of the spot size converter 1101 is normal to the width direction axis (x-axis) and the thickness direction axis (y-axis) of the exit area of the semiconductor laser 901, the width direction axis (x-axis) and the thickness direction axis (y-axis) can be independently handled by approximation.

Generally, a slenderness ratio of the exit area of semiconductor lasers is very large. Therefore, the outgoing light from the spot size converter combined with such a semiconductor laser, width direction divergence component SX-WG becomes large rather than thickness direction divergence component Sy-WG Consequently, the width direction divergence component Sx-WG of the outgoing light lies off the acceptance pattern S-FB of the optical fiber combined with the spot size converter. Parts of the divergence pattern Sx-WG lying off the acceptance pattern S-FB fails to penetrate into the optical fiber. In semiconductor lasers, the higher the power is, the slanderness ratio of the exit area is larger. Therefore, the higher the power of the semiconductor laser is, a domain of the width direction divergence component Sx-WG of the light exiting from the spot size converter lying off the acceptance pattern S-FB of the optical fiber becomes larger. Therefore, the light coupling efficiency between a semiconductor laser and an optical fiber decreases.

As described above, the conventional spot size converter had the problem to which light coupling efficiency decreases, so that the slenderness ratio of the exit area of the optical elements by the side of the incidence was so large that the slenderness ratio of the exit area of a semiconductor laser was large.

SUMMARY OF THE INVENTION

An object of the present invention is to provide a spot size converter which is able to couple optical elements of different spot size with each other at a high-efficiency, a semiconductor laser module in a combination of the spot size converter and semiconductor laser, and an optical fiber laser device using the spot size converter.

According to the present invention the above object is achieved by a spot size converter according to claim 1. The deoendent claims are directed to different advantageous aspects of the present invention.

To achieve the above objects, a spot size converter according to a second aspect of the present invention is comprised of a lead-in section and a lead-out section, the inclined side wall is located on lead-out section, and letting w0 be the width or the incident area of the lead-in section, letting h0 be the thickness of the incident area, letting w1 be the width of the exit area of the lead-in section, letting h1 be the thickness of the exit area of the lead-in section, and letting Sw be a width direction divergence component of the light entering to the lead-in section, the width w1 and the thickness h1 of the exit area of the lead-in section are defined so as to satisfy the following equation.

$$\sin(Sw) \times (w0/w1) = \sin(Sh) \times (h0/h1)$$

Therefore, the lead-in section is able to make a nonaxisymmetric divergence pattern of the incident light axisymmetric. By introducing the light thus made axisymmetric into the lead-out section, the divergence pattern of the outgoing light from the spot size converter becomes smaller than that in default of such a lead-in section. Consequently, it is able to couple a light output from optical elements with a highly slender exit area to optical fibers at a high-efficiency.

Additional objects and advantages of the present invention will be apparent to persons skilled in the art from a study of the following description and the accompanying drawings, which are hereby incorporated in and constitute a part of the specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 2a and 2b are drawings for explaining the light propagation in the embodiment of FIG. 1;

DESCRIPTION OF THE PREFERRED EMBODIMENTS

The present invention will be described in detail with reference to the attached drawings, FIGS. 1 through 8.

Figure 1:
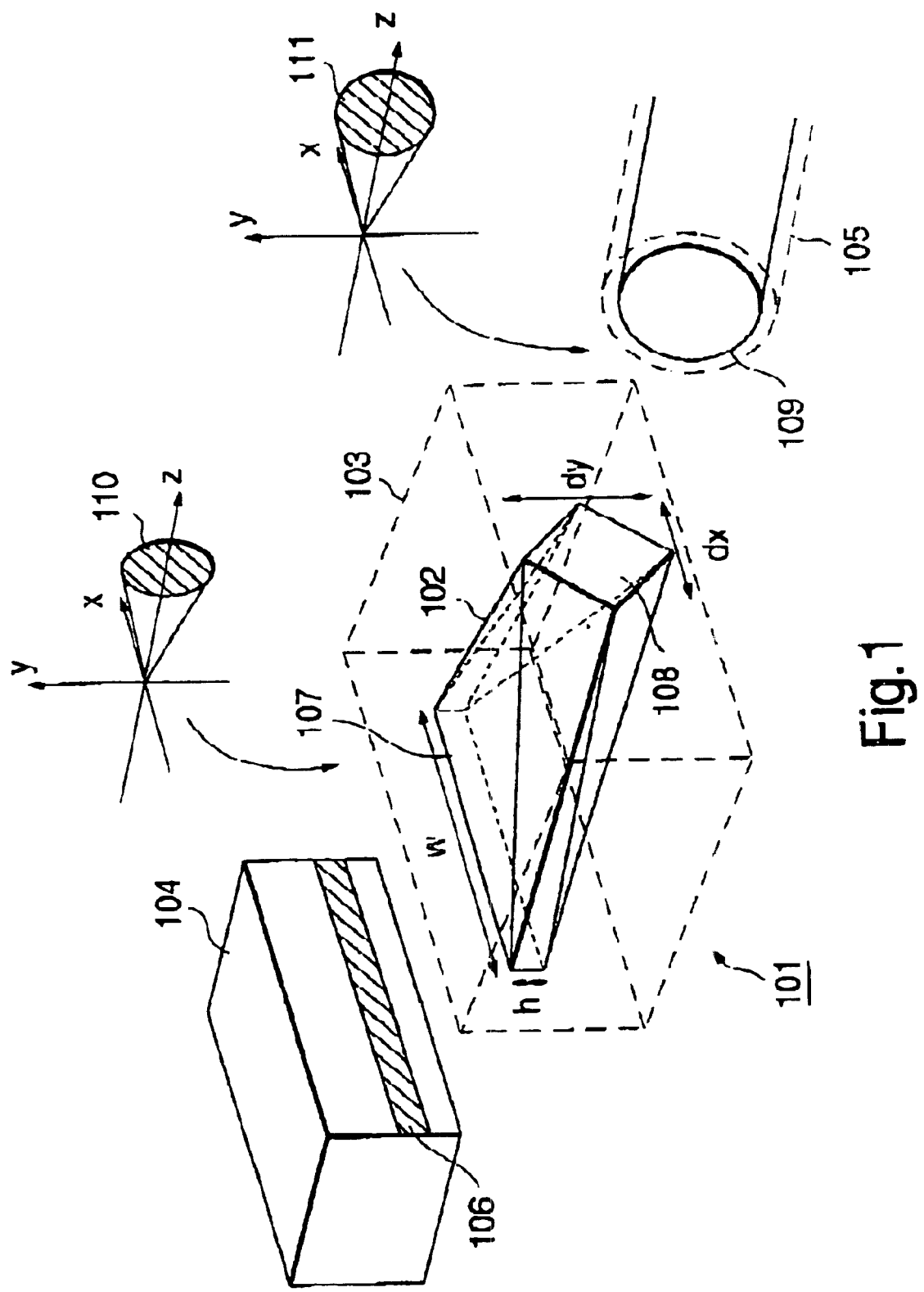
FIG. 1 is a perspective view for explaining the first embodiment of the spot size converter according to the present invention.
Figure 3A:
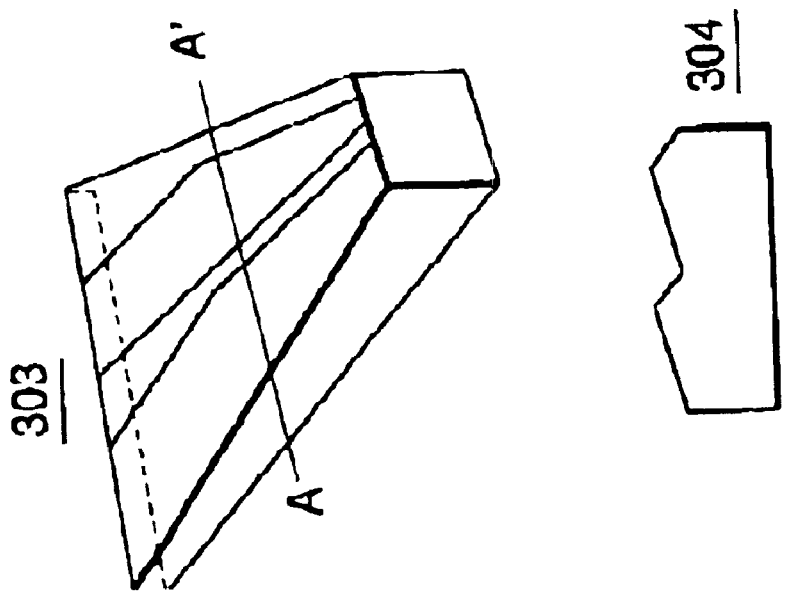
FIGS. 3a to 3e are perspective views showing various modifications of the spot size converter of the first embodiment; the examples of FIG. 3c is not covered by the invention.
Figure 3B:
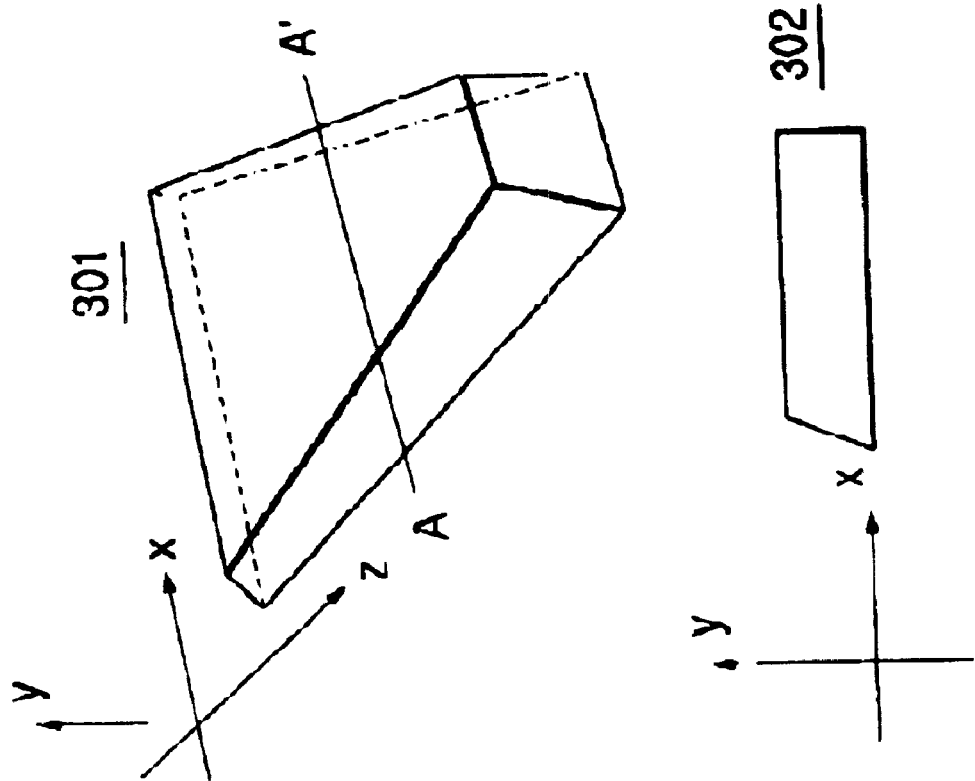
Figure 3D:
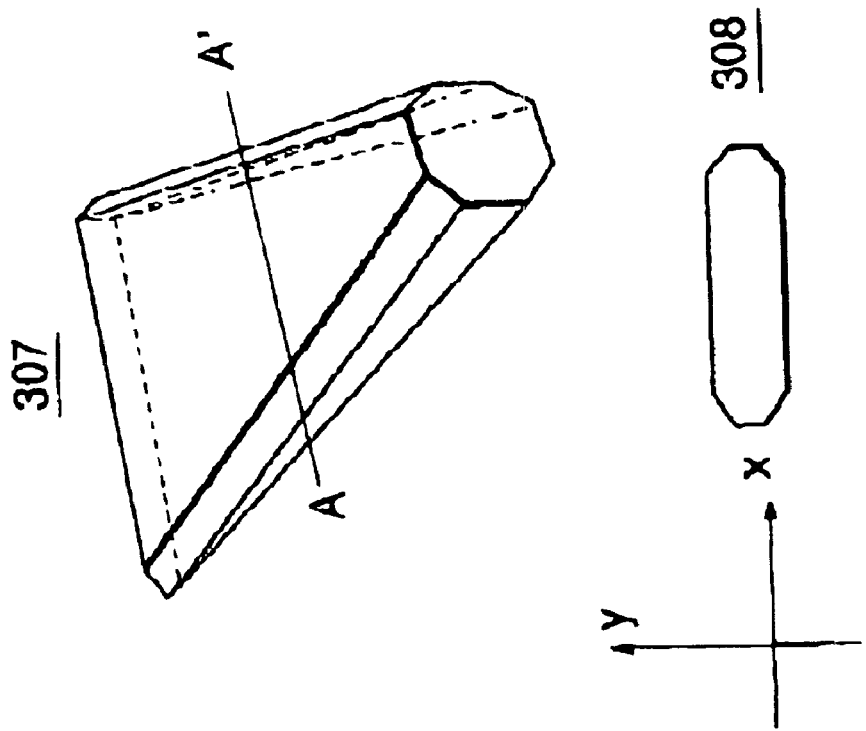
Figure 3C:
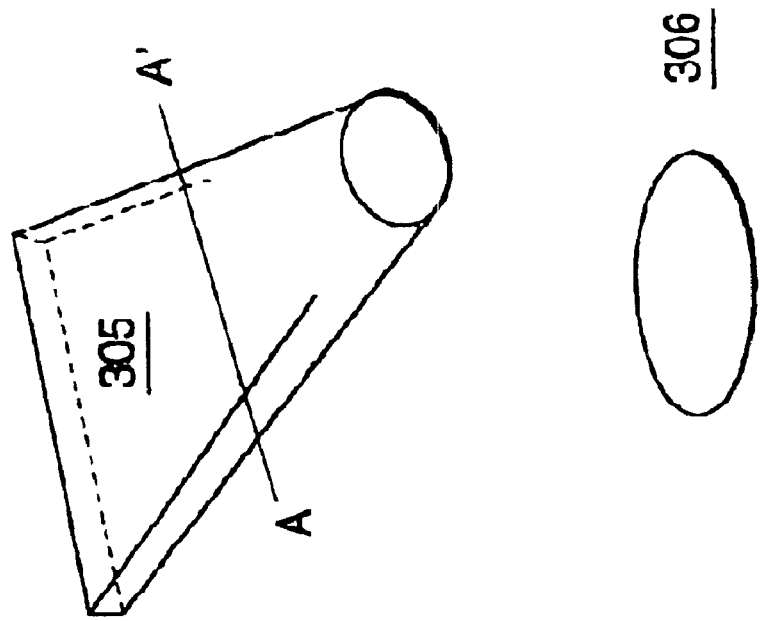
Figure 3E:
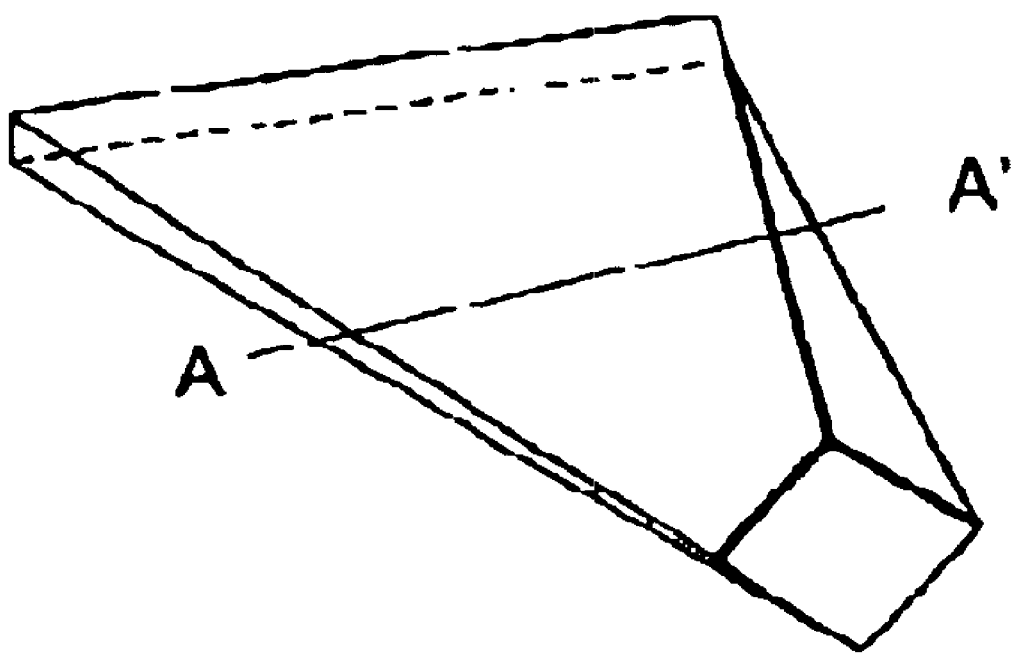

FIG. 1 is a perspective view for explaining the first embodiment of the spot size converter according to the present invention.

In FIG. 1, the numeral 101 denotes a spot size converter. The numeral 104 denotes a semiconductor laser. And the numeral 105 denotes an optical fiber. This spot size converter 101 is comprised of a core 102 and a cladding 103. The refractive index of the core 102 is made higher than the refractive index of the cladding 103). Consequently, light entered into the core 102 propagates inside the core 102 while repeating total reflection on the interface between the core 102 and the cladding 103.

In this embodiment, the spot size converter 101 is used for optically coupling an outgoing light from a semiconductor laser 104 to an optical fiber 105. In the spot size converter 101, the numeral 107 denotes an incident area of the core 102. The width and thickness of the incident area 107 are let be agreed with the width w and thickness h of the semiconductor laser exit area 106. The numeral 108 denotes the exit area of the core 102. The width and the thickness of the exit area 108 are agreed with the width dx and thickness dy of the receiving area 109 of an optical fiber 105.

Here, let the width direction and let the thickness direction of the incident area 107 of the core 102 of the spot size converter 101 be the x-axis and the y-axis. Each edge of the respective side walls of the spot size converter 102 on the exit area makes 45 degrees to the x-axis and the y-axis.

Referring now to FIGS. 2a and 2b, the feature of the spot size converter of such a construction will be described. As for FIG. 2a, a side wall shows the section 201 normal to the x-axis and the y-axis. As for FIG. 2b, a side wall shows the section 203 which is 45 degrees to a x-axis and the y-axis. The numeral 202 shows the route of light on the section 201. Moreover, the numeral 204 shows the route of light on the section 203.

On the section 201, as shown in FIG. 2a, when a light 202 is reflected on the side walls, the x-axis direction divergence component and the y-axis direction divergence component show changes of sign-reversing, respectively.

On the section 203, as shown in FIG. 2b, on the other hand, when a light 204 is reflected on a side wall, the amounts of the x-axis direction divergence component and the y-axis direction divergence component change places with each other. If the width w and the thickness h of the incident area 107 of the spot size converter 101, and the width dx and the thickness dy of the exit area have relations w>dx and h<dy, the x-axis component of the light divergence increases, while the y-axis component thereof decreases during the light propagating in the spot sire converter. On this account, when the side wall of a spot size converter is normal to the x-axis and the y-axis, the light outgoing from the spot size converter has a divergence pattern in which the x-axis direction divergence component is larger than that of the incident light, while the y-axis direction divergence component is smaller than that of the incident light.

However, when the side wall inclines, as shown in FIG. 1, the amounts of the x-axis direction divergence component and the y-axis direction divergence component change places with each other. Therefore, an action of the x-axis direction divergence component being increased and an action of the y-axis direction divergence component being decreased compensate each other. On this account, in the divergence pattern 111 of the outgoing light from the spot size converter 101, the x-axis direction divergence component and the y-axis direction divergence component are made uniform. Therefore, it is prevented that the light divergence pattern increases in only a specific direction.

FIGS. 3a to 3e illustrate various modifications of the spot size Converter of the first embodiment according to the present invention. In these drawings, the numerals 301, 303, 305, 307 and 309 indicate the respective shape of the spot size converters in perspective views. While the numerals 302, 304, 306, 308 and 310 indicate the respective shape of the spot size converters in sections.

As seen from these illustrated modifications, the inclined side wall portion of the spot size converter need not be exactly 45 degrees to the width direction axis (x-axis ) and the thickness direction axis (y-axis) of the incident area. That is, the inclined side wall portion of the spot size converter may be in any angle other than normal to the axes. Even in these modifications, the amounts of the x-axis direction divergence component and the y-axis direction divergence component change places with each other during the light repeating reflection on the inclined side wall for plural times. Therefore, as shown in these modifications, it is enough that the inclined side wall portion of the spot size converter inclines to the width direction axis (x-axis) and the thickness direction axis (y-axis) of the incident area. That is, the inclined side wall portion of the spot size converter is not needed to be exactly 45 degrees to the width direction axis (x-axis) and the thickness direction axis (y-axis).

To be more specific, it is essential that only a part of the side wall inclines in any angle other than normal to the side face part which accomplishes the inclination of those other than normal to the width direction axis (x-axis) and the thickness direction axis (y-axis) of the incident area. Spot size converters are generally comprised of a core and a cladding which are different in refractive index with each other. However, the spot size converter can be also comprised of only a core with a mirror finished side wall. Even in this structure, light propagates while repeating total reflection on the mirror-finished side wall.

Figure 4A:
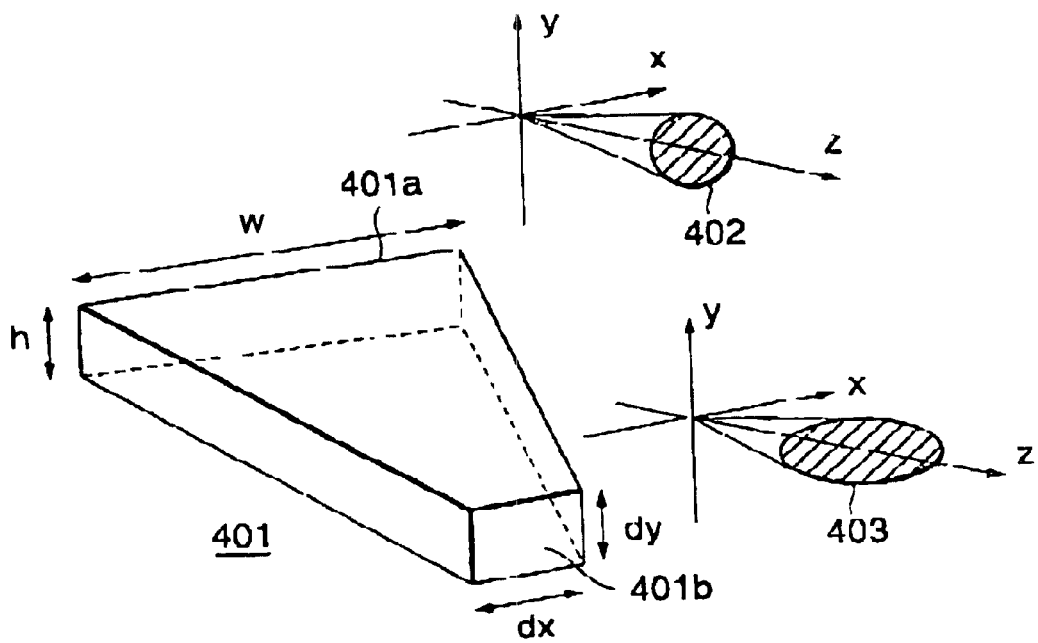
FIGS. 4a and 4b are perspective views for explaining the feature of the spot size converter according to the present invention as contrasted with the conventional spot size converter.
Figure 4B:
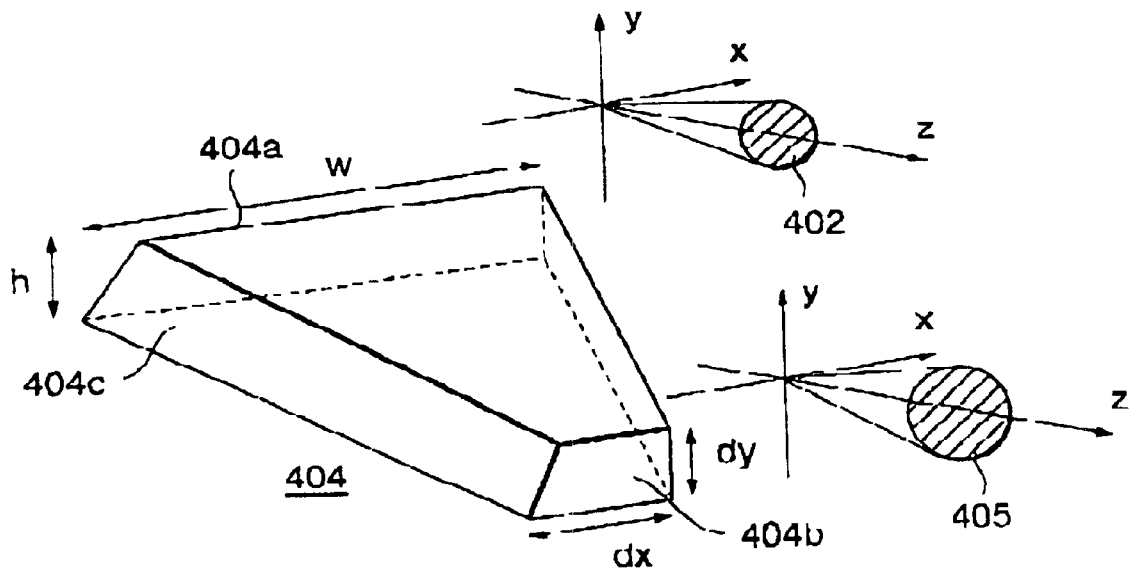
Figure 11:
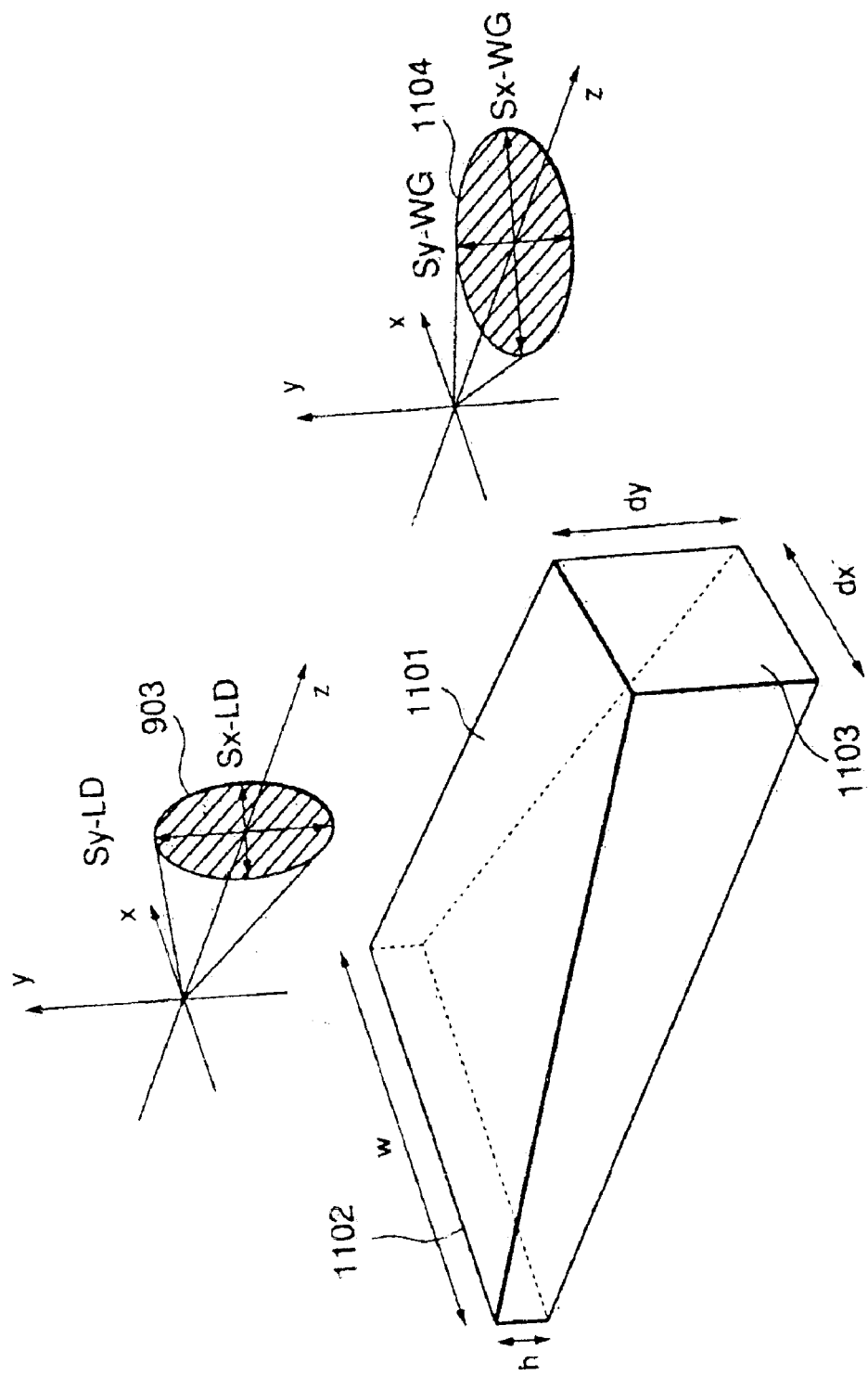
FIG. 11 is a perspective view for explaining the conventional spot size converter and its feature.

Referring now to FIGS. 4a and 4b, the feature of the spot size converter according to the present invention will be discussed in more detail as contrasted with the conventional spot size converter. Here, the spot size converter 401 of FIG. 4a is equivalent to the conventional spot size converter shown in FIG. 11. The spot size converter 404 of FIG. 4b is equivalent to the spot size converter according to the present invention shown in FIG. 3a. By the way, FIG. 4a and FIG. 4b show only the core section of a spot size converter, respectively. The width w and thickness h of the incident area, and the width dx and the thickness dy of the exit area of the conventional spot size converter 401, as shown in FIG. 4a, have relations of "w>dx" and "h<dy". On the other hand, in the spot size converter 404 according to the present invention, as shown in FIG. 4b, the width w and the thickness h of the incident area, and the width dx and the thickness dy of the exit area have relations of "w>dx" and "h–dy".

Moreover, the conventional spot size converter 401, as shown in FIG. 4a, is tapered from the incident area 401a to the exit area 401b. In the conventional spot size converter 401, the width direction edge and the thickness direction edge of the exit area 401b are parallel with the width direction axis (x-axis) and the thickness direction axis (y-axis) of the incident area 401a. In this case, the divergence pattern 403 of the outgoing light spreads only in the width direction, in comparison with the divergence pattern 402 of the incident lights.

The spot size converter 404 according to the present invention, as shown in FIG. 4b, is also tapered from incident area 404a to the exit area 404b. However one side face 404c of the core 404 inclines to the width direction axis (x-axis) and the thickness direction axis (x-axis) of the incident area 404a.

When light propagates inside the spot size converter 404 according to the present invention, as shown in FIG. 4b, the x-axis direction divergence component and the y-axis direction divergence component of the light divergence pattern change places with each other due to reflections on the inclined plane 404c. On this account, the width direction component of the divergence component which should become large is distributed also in the thickness direction. Therefore, in compared to the light divergence pattern 402 at the incident area, the divergence pattern 405 at the exit area 404b spreads both in the width direction and the thickness direction. In this case, the divergence pattern 408 of the outgoing light spreads only in the width direction, in comparison with the divergence pattern 402 of the incident light. However, the increasing rate of the width direction divergence component 403 of the light in exit area 401b is minimized.

By the way, the above discussion was made on spot size conversions for a case that the slenderness ratio of the incident area of the spot size converter was large, while the slenderness ratio of the exit area thereof is small. However, the above discussion holds for the case that the slenderness ratio of the incident area is made small and the slenderness ratio of the exit area is made large in accordance with a relation in size between the incident side optical element and the exit side optical element.

That is, even if the slenderness ratio of the incident area or the spot size converter is made small and the slenderness ratio of the exit area is made large in accordance with the relation in size of the spot sizes between the incident side optical element and the exit side optical element, a part of the side wall of the spot size converter is made inclined in any angle other than normal to the width direction axis (x-axis) and the thickness direction axis (y-axis) of the exit area. Thereby, the divergence pattern of the outgoing light can be prevented from increasing only in a specific direction. That is, as long as a spot size converter has a feature of converting spot size by varying dimensions of the incident area and the exit area, the present invention can be held.

As discussed above, in the spot size converter of the first embodiment according to the present invention, the x-axis direction divergence component and the y-axis direction divergence component of a divergence pattern of light change places with each other during the light repeating reflection on the inclined side wall. Then, in order to mike the divergence pattern of the outgoing light small, it is desirable to make equal beforehand the amount of the x-axis direction divergence component and the y-axis direction divergence component of the divergence pattern nf the incident light. Generally, the thickness direction divergence component of the outgoing light from a semiconductor laser is larger than the width direction. Light outgoing from semiconductor lasers has a divergence pattern in which the thickness direction divergence component is larger than the width direction divergence component. With this being the situation, a spot size converter for accommodating light with such characteristics, we will now discuss about another embodiment which has a lead-in section for making the divergence pattern of the incident light axisymmetric.

Figure 5:
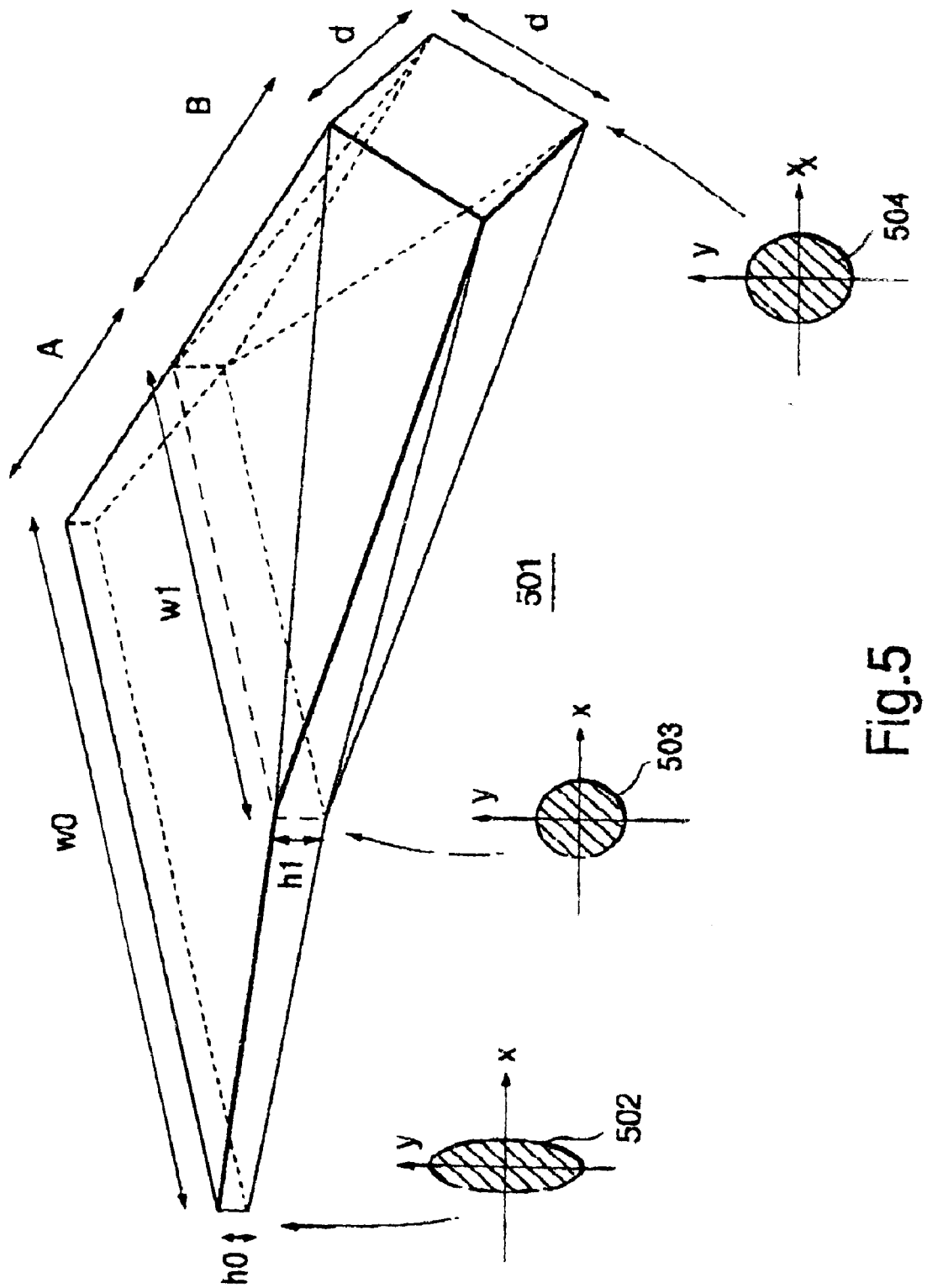
FIG. 5 is a perspective view showing a second embodiment of the spot size converter according to the present invention.

FIG. 5 is a perspective view showing the second embodiment of such a spot size converter according to the present invention.

In FIG. 5, a spot size converter 501 is comprised of a lead-in section A and a lead-out section B. The lead-out section B is a spot size converter which carries out a spot size conversion like the spot size converter of the first embodiment. The lead-in section A is placed in front of the spot size converter B. The lead-in section A has a function of changing a light divergence pattern, as will be described below. Therefore, the lead-in section A is also called optical divergence pattern changer. By the way, the optical divergence pattern changer A and the spot size converter B may be separated pieces or united to a single piece.

The side wall of the optical divergence pattern changer A is generally normal to the width direction axis (x-axis) and the thickness direction axis (y-axis) of the incident area. It is assumed that light having an elliptic divergence pattern 502 with the y-axis direction divergence component larger than the x-axis direction divergence component is entered into the incident area of the optical divergence pattern changer A. By having a dimension as defined below, the optical divergence pattern changer A changes the elliptic divergence pattern 502 of the incident light to a circular divergence pattern 503. Of the elliptic divergence pattern 502 of the incident light, let Sx0 and Sy0 be the x-axis direction divergence component and the y-axis direction divergence component, respectively Let also w0 and h0 be the width and the thickness of the incident area of the optical divergence pattern changer A, respectively. Let also w1 and h1 be the width and the thickness of the exit area of the optical divergence pattern changer A, respectively. Finally, let s1 be the divergence pattern of the outgoing light. Then, the divergence pattern s1 of the outgoing light the outgoing light divergence pattern S1 satisfies the following equation (3).

$$\sin(S1) = \sin(Sx0) \times (w0/w1) = \sin(Sy0) \times (h0/h1) \quad (3)$$

The amount of the width w1 and h1 of the exit area of the optical divergence pattern changer A is determined an that the outgoing light divergence pattern S1 may become within the light receiving pattern of the spot size converter B. Thereby, as for the spot size converter of the second embodiment according to the present invention, the fault to which only the direction of specification [ the divergence pattern of the outgoing light ] becomes large is compensated with the lead-out section. The lead-in section of such construction is also able to make the nonaxisymmetric divergence pattern of the incident light from an optical element having an exit area of very large slenderness ratio axisymmetric in advance, for providing the light axisymmetric in its divergence pattern into the spot size conversion section.

Figure 6:
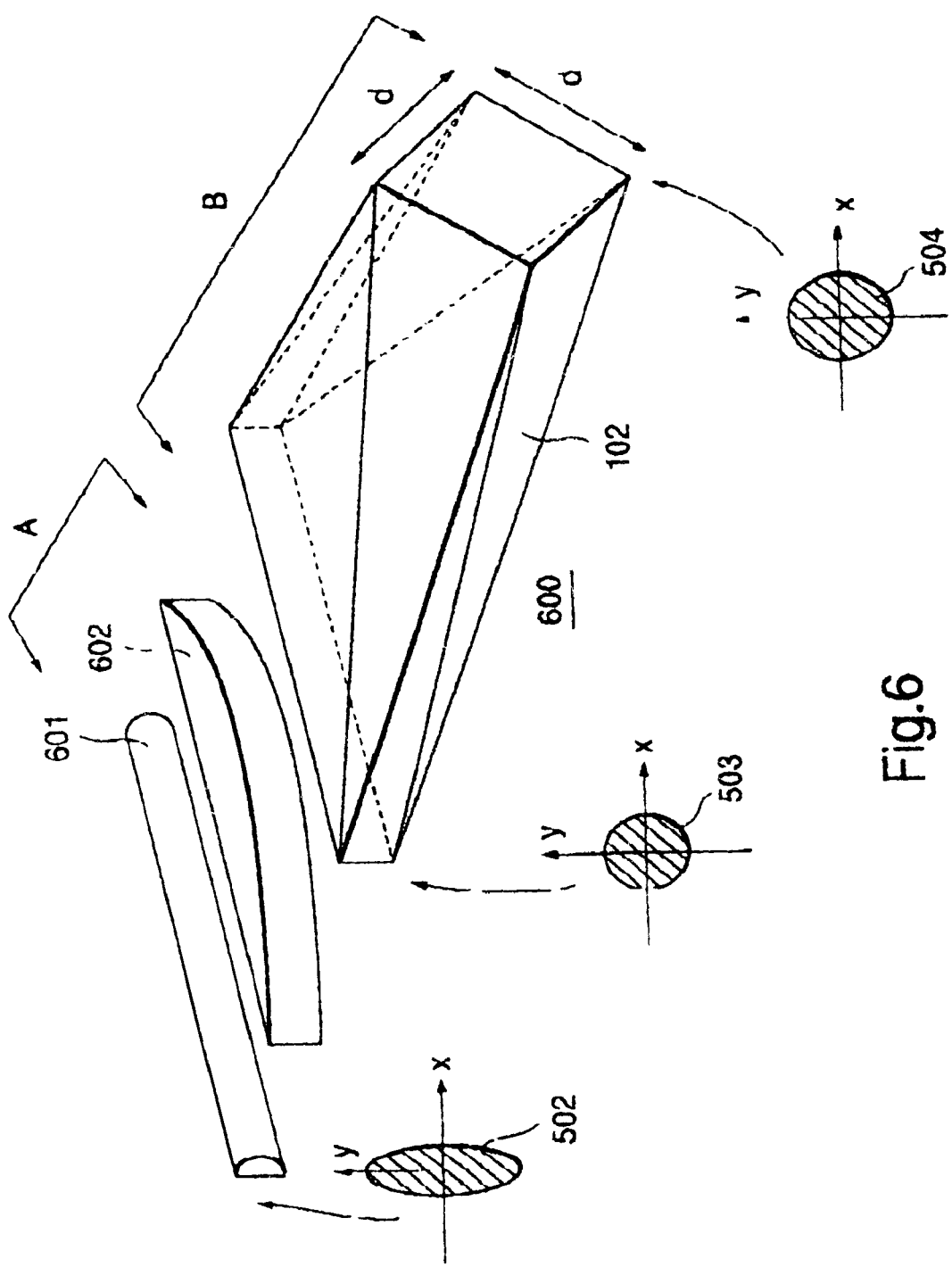
FIG. 6 is a perspective view showing the third embodiment of the spot size converter according to the present invention.

FIG. 6 is a perspective view showing the third embodiment of the spot size converter according to the present invention. The third embodiment also works like the second embodiment. In FIG. 6, the spot size converter 600 of the third embodiment is comprised of a lead-in section A and a lead-out section B. The lead-in section A is comprised of two types of cylindrical lenses 601 and 602. The lead-out section B is a spot size converter which carries out a spot size conversion like the spot size converter 101 of the first embodiment. By the way, FIG. 6 also shows only the core of the rear unit 102. The generatrix of the first cylindrical lens 601 lying in the incident area aide of the spot size converter extends in the x-axis direction. The generatrix of the second cylindrical lens 602 lying between the first cylindrical lens 601 and the rear unit 102 extends in the y-axis direction. Thus, according to that the generatrices of the first and second cylindrical lenses 601 and 602 extend in the x-axis direction and the y-axis direction, respectively, an elliptic divergence pattern is changed into a circular divergence patter.

Here, for changing the axisymmetric divergence pattern (circular pattern) of the outgoing light from the spot size converter to a nonaxisymmetric pattern (elliptical pattern), it is sufficient that the propagation direction of light is reversed in the spot side converter according to the second and third embodiments according to the present invention.

Figure 7:
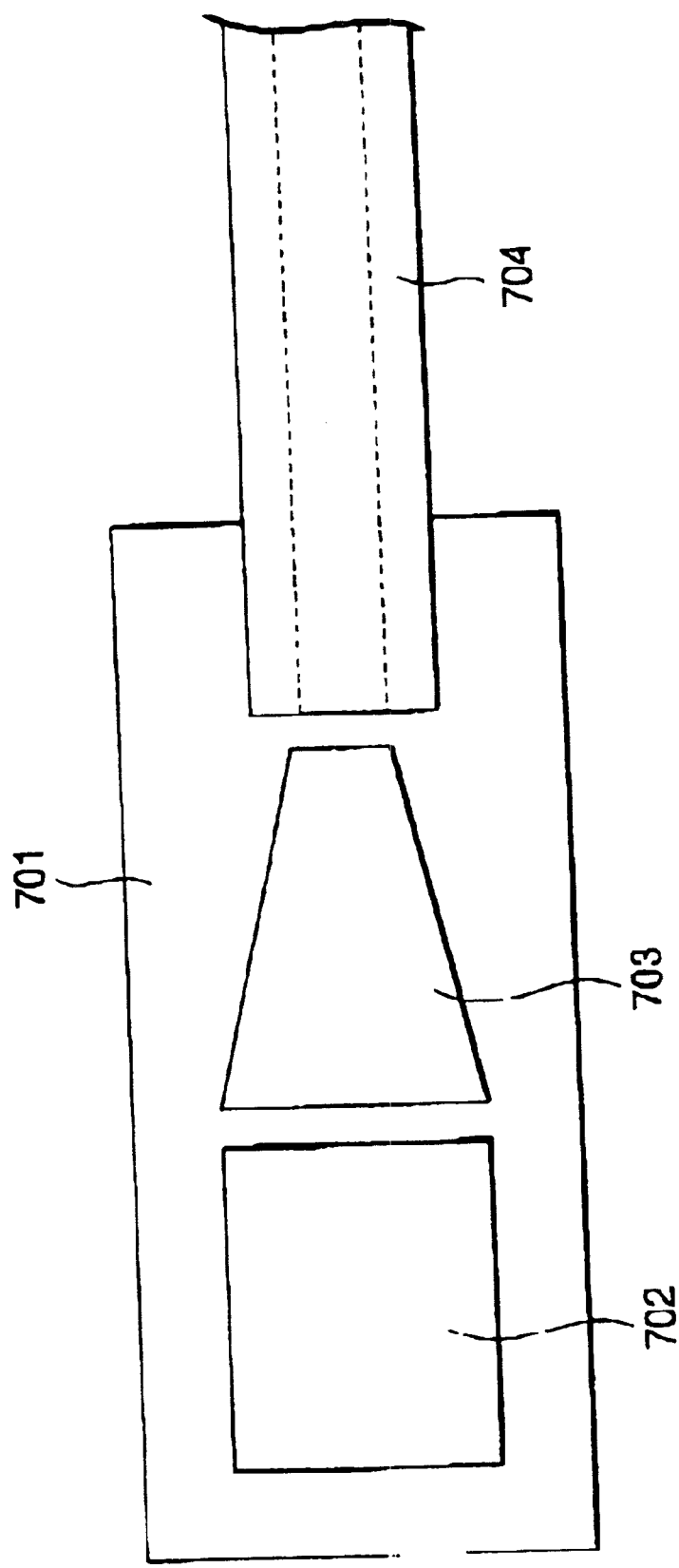
FIG. 7 is a plan view showing an embodiment of the semiconductor laser module according to the present invention.

FIG. 7 is a plan view showing an embodiment of the semiconductor laser module according to the present invention. This embodiment relates to the semiconductor laser module which has the spot size converter according to any one of the first to third embodiments.

In FIG. 7, the numeral 701 denotes a substrate. The numeral 702 denotes a semiconductor laser. The numeral 703 denotes a spot size converter according to any one of the first to third embodiments. And, the numeral 704 denotes an optical fiber.

By having the spot size converter according to any one of the first to third embodiments, the semiconductor laser module is able to convert the spot size of the outgoing light from the semiconductor laser 702 into the spot size of the receiving area of the optical fiber 704. Also the semiconductor laser module is also able to reduce the divergence pattern of the outgoing light below the light receiving pattern of the optical fiber 704. Therefore, it is possible to optically couple the semiconductor laser module to the optical fiber 704 at a high-efficiency.

Figure 8:
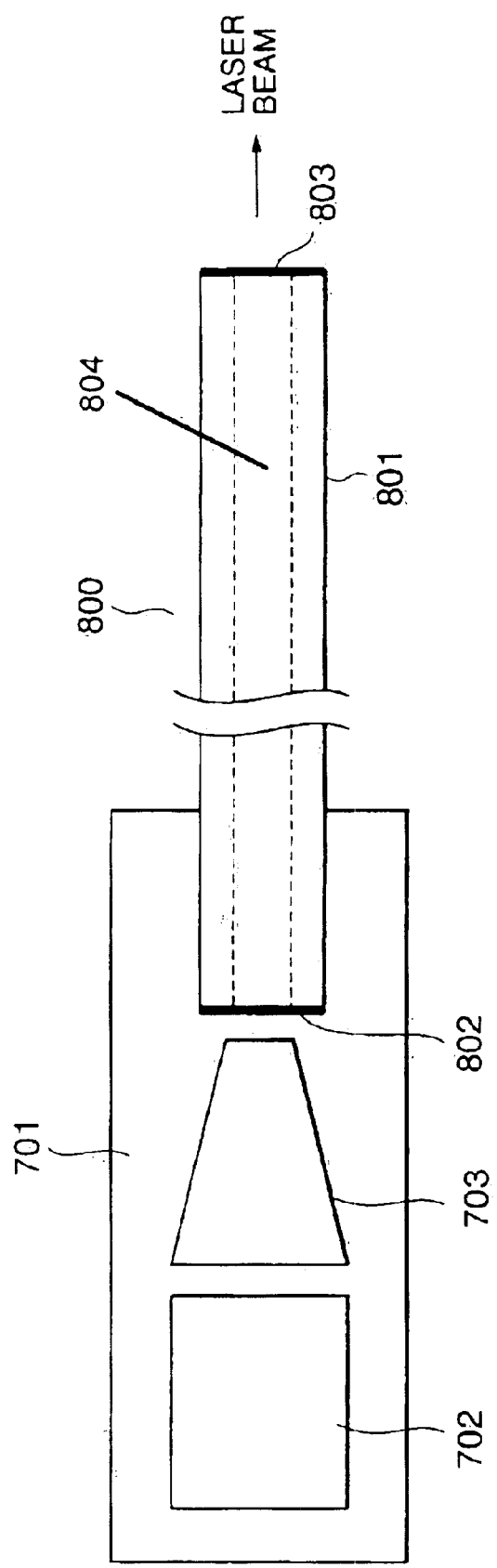
FIG. 8 is a plan view showing an embodiment of the optical fiber laser device according to the present invention.
Figure 9:
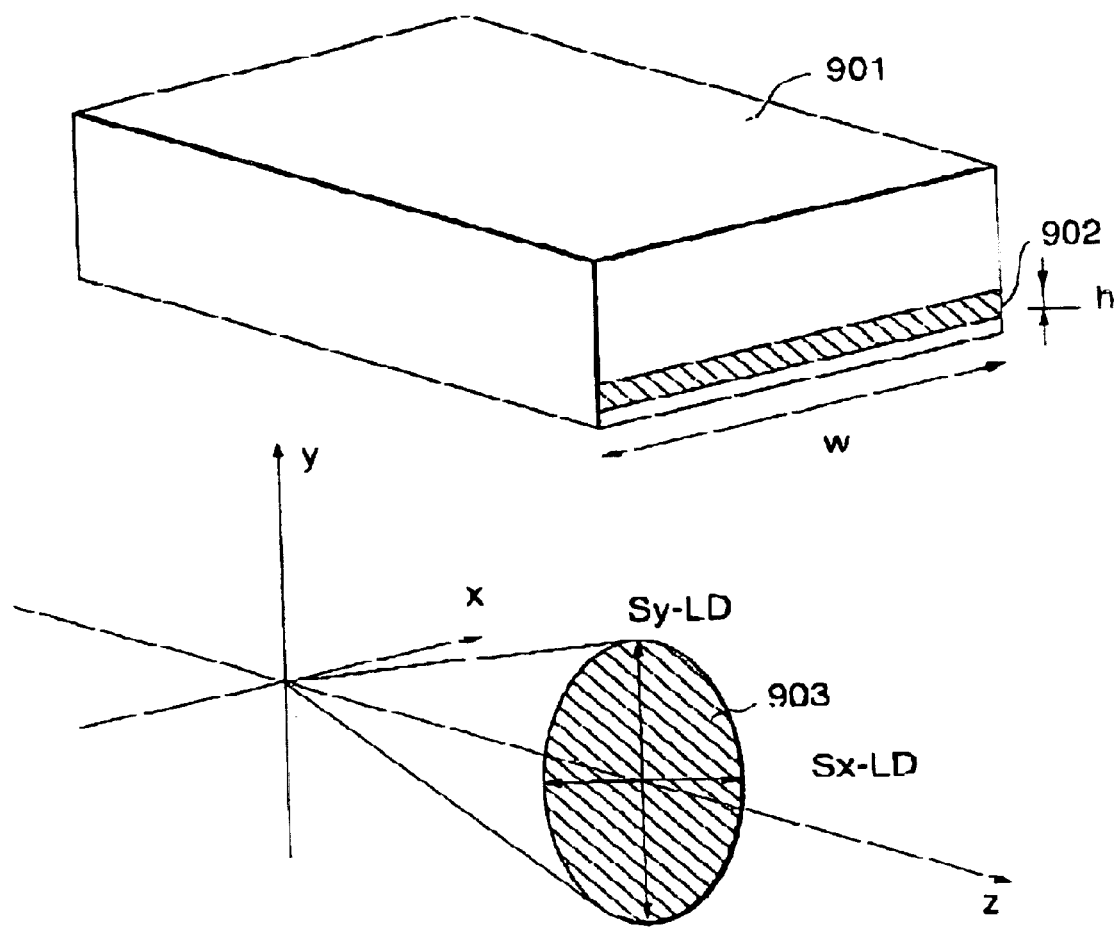
FIG. 9 is a perspective view for explaining the divergence pattern of the exit area and the outgoing light of a common semiconductor laser.
Figure 10:
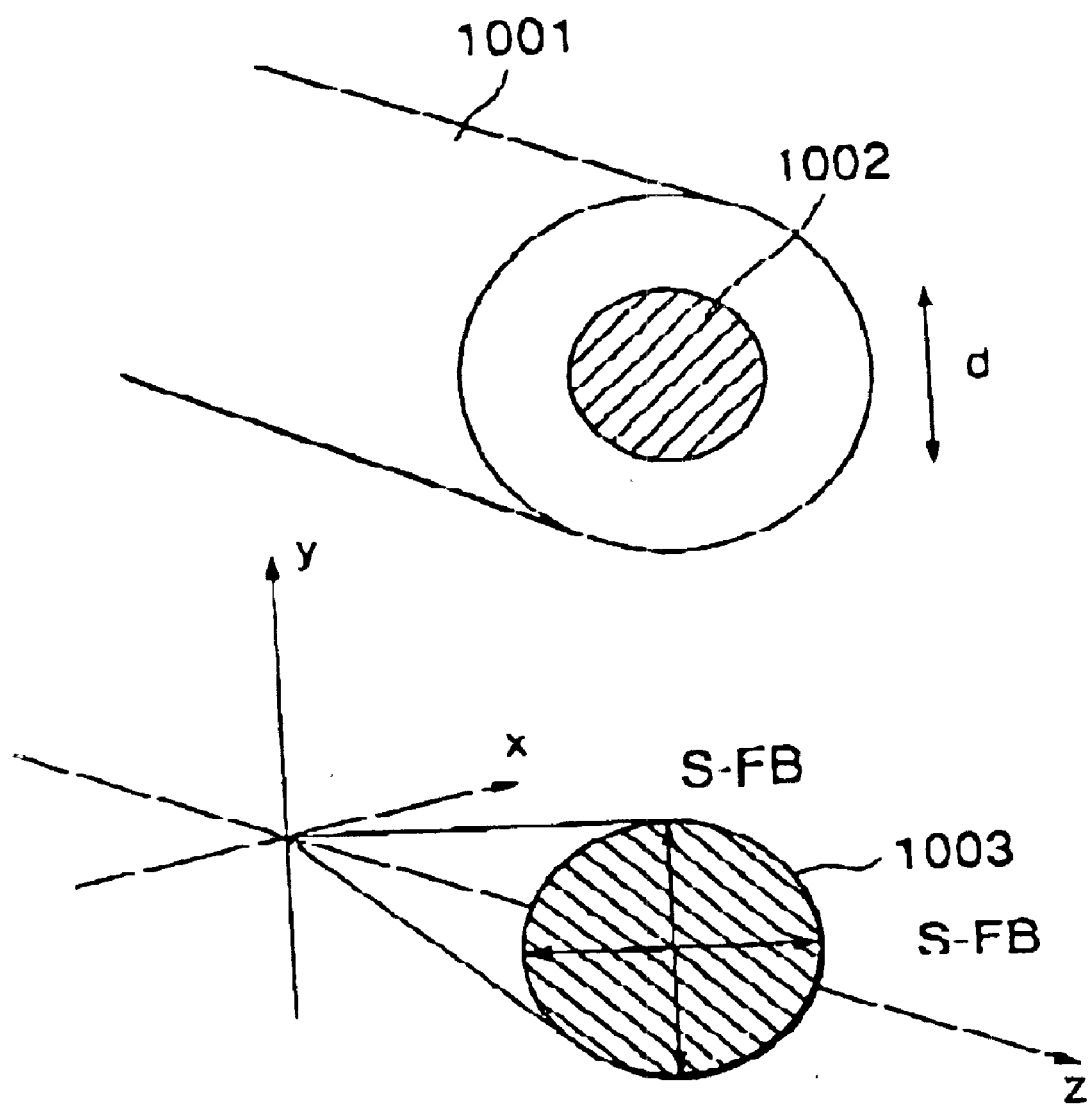
FIG. 10 is a perspective view for explaining the divergence pattern of the incident light received the incident area of a general optical fiber, and there.

FIG. 8 is a plan view showing an embodiment of an optical fiber laser according to the present invention. This embodiment relates to such an optical fiber laser which has a spot size converter according to any one of the first to third embodiments.

In FIG. 8, the numeral 701 denotes a substrate. The numeral 702 denotes a semiconductor laser. The numeral 703 denotes the spot size converter according to any one of the first to third embodiment. And the numeral 800 denotes an optical fiber resonator. This optical fiber resonator 800 is provided with reflectors 802,803 on both ends or the optical fiber 801 where the core 804 is added with laser activator. Now, an operation of the optical fiber laser will be discussed. The outgoing light from the semiconductor laser 702 is introduced into the optical fiber resonator 800 through the spot size converter 703. The laser light is absorbed in and excites the laser activator in the core 804. This excitation causes an induced emission to make the laser activator emit light. The induced emission of light makes a reciprocating propagation in the core 801 by being reflected on the reflectors 802, 803 on both ends. The reciprocating propagation cause a resonance to make a laser light emit from the resonator 800 through the reflector 803. In order to achieve the laser light of a high energy by the optical fiber laser, it is necessary to input the excitation light of a high energy into the optical fiber resonator 800. Therefore, in spite of the semiconductor laser 702 being made the slenderness ratio of its exit area high, it is able to introduce the high power laser light from the semiconductor laser 702 into the optical fiber resonator 800 with a high-efficiency by using the spot size converter 703 in any one of the above-described forms.

Here, a single cladding type optical fiber is generally used as an optical fiber for comprising optical fiber resonators. In this type of optical fiber, an excitation light is introduced into the core of the optical fiber. However, when a double cladding type optical fiber is used for such resonators, the excitation light is introduced into the inner cladding.

As described above, the present invention is able to provide a spot size converter capable of coupling optical elements of different spot size with each other with a high-efficiency, a semiconductor laser module in a combination of the spot size converter and a semiconductor laser, and an optical fiber laser device using the spot size converter.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety or individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is;

1. A spot size converter with a generally elongated rectangular block shape, comprising:

an optical axis elongating along an elongated direction of the spot size converter;

a generally rectangular incident area crossing the optical axis, with a first slenderness ratio adapted to meet with an exit area of a light source;

a generally rectangular exit area crossing the optical axis, with a second slenderness ratio different from the first slenderness ratio adapted to meet with an incident area of a light receiving object; and a surrounding side wall consisting of a plurality of flat planes defining a cross section orthogonal to the optical axis and defining a light guide in the spot size converter, wherein at least one of the flat planes of the surrounding side wall inclines so that one side of the cross section defined by the flat planes of the surrounding side wall inclines to the optical axis of the spot size converter and every axis of a width direction and a thickness direction defining the generally rectangular incident area.

2. A spot size converter as claimed in claim 1, wherein the spot size converter is comprised of a lead-in side first section and a lead-out side second section; and every flat plane of the surrounding side wall of the lead-in side first section is normal to every axis of the width direction and the thickness direction defining the generally rectangular incident area;

the inclined flat plane is located on the lead-out side second section, and letting $w0$ be the width of the incident area of the lead-in side first section;

letting $h0$ be the thickness of the incident area of the lead-in side first section;

letting $w1$ be the width of the exit area of the lead-in side first section;

letting $h1$ be the thickness of the exit area of the lead-in side first section;

letting $Sw$ be a width direction divergence component of the light entering to the lead-in side first section; and letting $Sh$ be a thickness direction divergence component of the light entering to the lead-in side first section; and the lead-in side first section is defined so as to satisfy the following equation, $$\sin(Sw) \times (w0/w1) = \sin(Sh) \times (h0/h1).$$

3. A spot size converter as claimed in claim 1, wherein the spot size converter is comprised of a lead-out side first section and a lead-in side second section; and every flat plane of the surrounding side wall of the lead-out side first section is normal to every axis of the width direction and the thickness direction defining the generally rectangular exit area;

the inclined flat plane is located on the lead-in side second section, and letting $w0$ be the width of the exit area of the lead-out side first section;

letting $h0$ be the thickness of the exit area of the lead-out side first section;

letting $w1$ be the width of the incident area of the lead-out side first section;

letting $h1$ be the thickness of the incident area of the lead-out side first section;

letting $Sw$ be a width direction divergence component of the light exiting from the lead-out side first section, and letting $Sh$ be a thickness direction divergence component of the light exiting from the lead-out side first section, the lead-out side first section is defined so as to satisfy the following equation $$\sin(Sw) \times (w0/w1) = \sin(Sh) \times (h0/h1).$$

4. A semiconductor laser module comprising:

a semiconductor laser; and a spot size converter with a generally elongated rectangular block shape combined with the semiconductor laser so that the spot size of the outgoing light from the semiconductor laser might be converted into a desired spot size;

wherein the spot size converter including:

an optical axis elongating along the elongated direction of the spot size converter;

a generally rectangular incident area crossing the optical axis, with a first slenderness ratio adapted to meet with an exit area of a light source;

a generally rectangular exit area crossing the optical axis, with a second slenderness ratio different from the first slenderness ratio adapted to meet with an incident area of a light receiving object; and a surrounding side wall consisting of a plurality of flat planes defining a cross section orthogonal to the optical axis and defining a light guide in the spot size converter, wherein at least one of the flat planes of the surrounding side wall inclines so that one side of the cross section defined by the flat planes of the surrounding side wall inclines to the optical axis of the spot size converter and every axis of a width direction and a thickness direction defining the generally rectangular incident area.

5. A semiconductor laser module as claimed in claim 4, wherein the spot size converter is comprised of a lead-in side first section and a lead-out side second section; and every flat plane of the surrounding side wall of the lead-in side first section is normal to every axis of the width direction and the thickness direction defining the generally rectangular incident area;

the inclined flat plane is located on the lead-out side second section, and letting w0 be the width of the incident area of the lead-in side first section;

letting h0 be the thickness of the incident area of the lead-in side first section;

letting w1 be the width of the exit area of the lead-in side first section;

letting h1 be the thickness of the exit area of the lead-in side first section;

letting Sw be a width direction divergence component of the light entering to the lead-in side first section; and letting Sh be a thickness direction divergence component of the light entering to the lead-in side first section; and the lead-in side first section is defined so as to satisfy the following equation, $$\sin(Sw) \times (w0/w1) = \sin(Sh) \times (h0/h1).$$

6. A semiconductor laser module as claimed in claim 4, wherein the spot size converter is comprised of a lead-out side first section and a lead-in side second section; and every flat plane of the surrounding side wall of the lead-out side first section is normal to every axis of the width direction and the thickness direction defining the generally rectangular exit area;

the inclined flat plane is located on the lead-in side second section, and letting w0 be the width of the exit area of the lead-out side first section;

letting h0 be the thickness of the exit area of the lead-out side first section;

letting w1 be the width of the incident area of the lead-out side first section;

letting h1 be the thickness of the incident area of the lead-out side first section;

letting Sw be a width direction divergence component of the light exiting from the lead-out side first section, and letting Sh be a thickness direction divergence component of the light exiting from the lead-out side first section, the lead-out side first section is defined so as to satisfy the following equation $$\sin(Sw) \times (w0/w1) = \sin(Sh) \times (h0/h1).$$

7. An optical fiber laser device semiconductor laser module comprising an optical fiber core with a laser activator, and a semiconductor laser for introducing excitation light into the optical fiber core so that the laser activator is excited by the excitation light, wherein there lies a spot size converter with a generally elongated rectangular block shape between the semiconductor laser and the optical fiber, the spot size converter including:

an optical axis elongating along the elongated direction of the spot size converter;

a generally rectangular incident area crossing the optical axis, with a first slenderness ratio adapted to meet with an exit area of a light source;

a generally rectangular exit area crossing the optical axis, with a second slenderness ratio different from the first slenderness ratio adapted to meet with an incident area of a light receiving object; and a surrounding side wall consisting of a plurality of flat planes defining a cross section orthogonal to the optical axis and defining a light guide in the spot size converter, wherein at least one of the flat planes of the surrounding side wall inclines so that one side of the cross section defined by the flat planes of the surrounding side wall inclines to the optical axis of the spot size converter and every axis of a width direction and a thickness direction defining the generally rectangular incident area.

8. An optical fiber laser device semiconductor laser module as claimed in claim 7, wherein the spot size converter is comprised of a lead-in side first section and a lead-out side second section; and every flat plane of the surrounding side wall of the lead-in side first section is normal to every axis of the width direction and the thickness direction defining the generally rectangular incident area;

the inclined flat plane is located on the lead-out side second section, and letting w0 be the width of the incident area of the lead-in side first section;

letting h0 be the thickness of the incident area of the lead-in side first section;

letting w1 be the width of the exit area of the lead-in side first section;

letting h1 be the thickness of the exit area of the lead-in side first section;

letting Sw be a width direction divergence component of the light entering to the lead-in side first section; and letting Sh be a thickness direction divergence component of the light entering to the lead-in side first section; and the lead-in side first section is defined so as to satisfy the following equation, $$\sin(Sw) \times (w0/w1) = \sin(Sh) \times (h0/h1).$$

9. An optical fiber laser device semiconductor laser module as claimed in claim 7, wherein the spot size converter is comprised of a lead-out side first section and a lead-in side second section; and every flat plane of the surrounding side wall of the lead-out side first section is normal to every axis of the width direction and the thickness direction defining the generally rectangular exit area;

the inclined flat plane is located on the lead-in side second section, and letting w0 be the width of the exit area of the lead-out side first section;

letting h0 be the thickness of the exit area of the lead-out side first section;

letting w1 be the width of the incident area of the lead-out side first section;

letting h1 be the thickness of the incident area of the lead-out side first section;

letting Sw be a width direction divergence component of the light exiting from the lead-out side first section, and letting Sh be a thickness direction divergence component of the light exiting from the lead-out side first section, the lead-out side first section is defined so as to satisfy the following equation $$\sin(Sw) \times (w0/w1) = \sin(Sh) \times (h0/h1).$$

10. An optical spot size converter, comprising:

a core having a substantially elongated rectangular shape;

a core incident surface at an incident end of the core;

a core exit surface at an exit end of the core; and a core surrounding side wall extending between the core incident surface and the core exit surface to define a core peripheral surface;

wherein the core defines an optical axis, a width axis, and a thickness axis, which are orthogonal to one another, wherein the optical axis defines a direction of light substantially from the core incident surface to the core exit surface, wherein the core incident surface and the core exit surface are both normal to the optical axis, which extends therebetween, wherein the core incident surface is substantially rectangular in shape and has a first slenderness ratio adapted to correspond to an exit area of a light source, wherein the core exit surface is substantially rectangular in shape and has a second slenderness ratio, different from the first slenderness ratio, adapted to correspond to an incident area of a light receiving object;

wherein the core surrounding side wall comprises a plurality of planar, core side surfaces, and wherein at least one of the core side surfaces is angled at least with respect to the width axis and the thickness axis, defining an inclined plane.

11. The optical spot converter of claim 10, further comprising:

an optical divergence pattern changer, a changer incident surface at an incident end of the optical divergence pattern changer;

a changer exit surface at an exit end of the optical divergence pattern changer; and a changer surrounding side wall extending between the changer incident surface and the changer exit surface to define a changer peripheral surface;

wherein the changer exit surface adjoins the core incident surface, wherein the changer incident surface and the changer exit surface are both normal to the optical axis, which extends therebetween and defines the direction of the light substantially from the changer incident surface to the changer exit surface, wherein the changer incident surface is substantially rectangular, and wherein dimensions of the changer incident surface and the changer exit surface satisfy the equation $$\sin(Sw) \times (w0/w1) = \sin(Sh) \times (h0/h1),$$

w0 being a width of the changer incident surface, h0 being a thickness of the changer incident surface, w1 being a width of the changer exit surface, h1 being a width of the changer exit surface, Sw being a width direction divergence component of the light entering the changer incident surface, and Sh being a thickness direction divergence component of the light entering the changer incident surface.

12. The optical spot converter of claim 11, wherein the core and the optical divergence pattern changer are integrally formed.

13. The optical spot converter of claim 10, further comprising:

an optical divergence pattern changer;

a changer incident surface at an incident end of the optical divergence pattern changer;

a changer exit surface at an exit end of the optical divergence pattern changer; and a changer surrounding side wall extending between the changer incident surface and the changer exit surface to define a changer peripheral surface;

wherein the changer exit surface adjoins the core incident surface, wherein the changer incident surface and the changer exit surface are both normal to the optical axis, which extends therebetween and defines the direction of the light substantially from the changer incident surface to the changer exit surface, wherein the changer exit surface is substantially rectangular, and wherein dimensions of the changer exit surface and the changer exit surface satisfy the equation $$\sin(Sw) \times (w0/w1) = \sin(Sh) \times (h0/h1),$$

w0 being a width of the changer exit surface, h0 being a thickness of the changer exit surface, w1 being a width of the changer incident surface, h1 being a width of the changer incident surface, Sw being a width direction divergence component of the light exiting the changer exit surface, and Sh being a thickness direction divergence component of the light exiting the changer exit surface.

14. The optical spot converter of claim 13, wherein the core and the optical divergence pattern changer are integrally formed.

15. The optical spot converter of claim 10, wherein the inclined plane is also angled with respect to the optical axis.

* * * * *